No. 649,854. Patented May 15, 1900.
J. A. W. LUNDBORG.
DENTIST'S MOUTH DILATOR, &c.
(Application filed June 15, 1899.)
(No Model.)
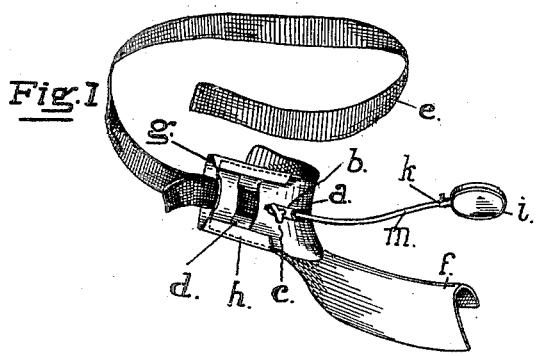
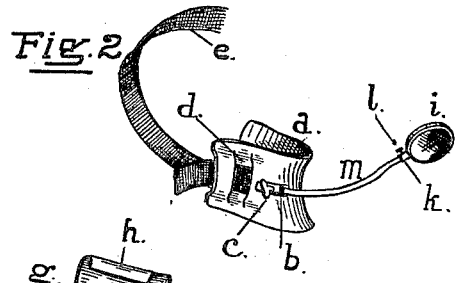
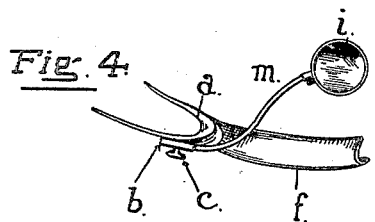
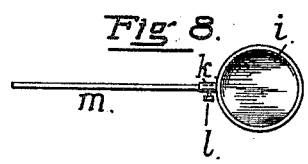
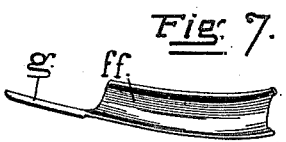
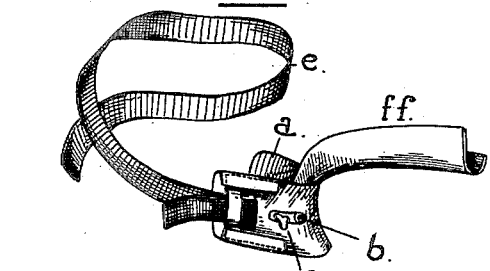
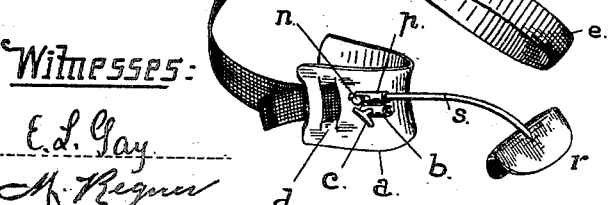
Witnesses:
E. L. Gay
M. Regner
Inventor:
John A. W. Lundborg
by
Smith & Osborn
his Attys.
THE NORRIS PETERS CO., PHOTO-LITHO., WASHINGTON, D. C.

UNITED STATES PATENT OFFICE.

JOHN A. W. LUNDBORG, OF SAN FRANCISCO, CALIFORNIA.

DENTIST'S MOUTH-DILATOR, &c.

SPECIFICATION forming part of Letters Patent No. 649,854, dated May 15, 1900.

Application filed June 15, 1899. Serial No. 720,612. (No model.)

*To all whom it may concern:*

Be it known that I, JOHN A. W. LUNDBORG, a citizen of the United States of America, residing in the city and county of San Francisco, in the State of California, have invented new and useful Improvements in Dentists' Mouth-Dilators, Lip and Tongue Guards, and Mirror-Holders, of which the following is a specification.

This invention relates to a novel device for use in dental operations to dilate or stretch the patient's mouth and to protect the lip and hold it away from the teeth while the operator is at work, and also a means for supporting a dental mirror in the mouth at the same time. This device, to which I have given the name of a "mouth-dilator, lip and tongue guard, and mirror-holder," is designed to take the place of the well-known and generally-used rubber dam. Its principal functions are to stretch or draw back the corner of the mouth, so as to expose the back teeth or to give access to posterior portions of the front teeth, also to hold the lip of the patient out of the way and to protect the same from the contact of the instruments, whereby the operations of preparing the cavity of the tooth and placing the filling can be carried on without the use of the rubber dam. In addition to these functions the device is adapted for use as a mirror-holder to adjustably support a dental mirror in various positions in the patient's mouth and as a support for a device to hold the patient's tongue away from the teeth of the lower jaw, which parts form separate attachments that are connected to or disconnected from the dilator as required for use.

To such ends and purpose my said invention consists in certain novel parts and combination of parts, as hereinafter fully described, and pointed out in the claims at the end of this specification, reference being had to the accompanying drawings for a clear and full understanding of the construction of the device.

Figure 1 of the drawings is a view in perspective of the dilator, lip-guard, and mirror-holder adjusted for use on the right-hand side of a patient's mouth to distend the corner of the mouth and hold down the lower lip on that side of the mouth. Fig. 2 is a view in perspective of the dilator or the part that engages and draws back the corner of the mouth. Fig. 3 is a similar view of the lip-guard separated from the dilator. Fig. 4 is a top view of Fig. 1 without the neckband. Fig. 5 represents the device adjusted for drawing back and protecting the upper lip on the right-hand side of a patient's mouth. Fig. 6 is a perspective view of the lip-guard in Fig. 5 detached from the dilator. Fig. 7 is a top view of Fig. 5. Fig. 8 is a top view of the mouth-mirror and its flexible wire support detached from the dilator. Fig. 9 is a view in perspective of the tongue-holding attachment fixed in position on the dilator by which it is supported in the mouth. Fig. 10 is a side view of such attachment.

A complete device to meet all the requirements of the dental operator includes a dilator $a$, a pair of lip-guards $f$ and $ff$, either of which is adapted by a change of position from one side to the other of the mouth to cover either the lower lip on one side or the upper lip on the other side of the mouth, and the two attachments consisting of the mouth-mirror $i$ and the tongue-holder $r$. When the part $a$ is formed of sheet metal, a narrow strip of that material is doubled on itself and bent at the angle in a smooth curve, so as to fit the corner of the mouth, or, if cast or molded from other material, it is similarly shaped to lie upon the inner and the outer surfaces of the cheek when it is introduced between the lips and drawn back by the strap. The outer flap or plate is formed or provided with a buckle portion $d$ to attach to it one end of the band or strip $e$; but the inner flap that lies inside the mouth has a smooth surface without the slits. The neckband $e$ is formed of elastic webbing, and while one end is attached to the part $a$ the other end is secured to some part of the patient's clothing after being passed behind the neck, and sufficient tension is produced thereby to properly draw back the part $a$ and dilate the corner of the mouth. A tubular socket $b$ is provided on the front face of the outer flap of the part $a$, and in that socket the end of the mirror-supporting wire $m$ is inserted when the mirror is required. A clamp-screw working through the side of this socket in a screw-threaded bearing forms the means of fastening that wire in the socket. The rim of the mirror $i$ is provided with a short socket $k$ to take the other end of the wire $m$, and a set-screw $l$, working through that socket, clamps the wire in that part. The wire $m$ used for this purpose should have such flexibility or pliability that it can readily be bent in any direction in curves or at various angles to bring the mirror into different positions, and at the same time it should have sufficient stiffness or rigidity to support the mirror properly under all the shapes and angles in which the wire may be bent.

The lip-guard is a curved plate with a groove or channel to admit the lip and having side pieces or flaps of proper shape to lie over and cover both the outer side and the inner side of the lip. These flaps or members spring from a flat cheek-piece or plate $g$, on which are dovetail slots or grooves $h\,h$ along the top and bottom edges and on the front or outer face to receive the front plate of the part $a$. These two parts $g$ and $a$ are united or temporarily fastened together by inserting the edges of the front plate of the part $a$ beneath the overlapping edges $h\,h$ and pressing back the part $g$, so that the two parts lie closely together, as shown in Figs. 1 and 4. In that position they are joined together by the friction of the parts without requiring an additional fastening—such as a set-screw, for instance. The guard $ff$ has substantially the same form as the guard $f$, excepting that the plate that lies over and covers the lip springs from the upper side of the plate or cheek-piece $g$ instead of from the lower side. These parts are formed on curves to conform somewhat to the curvature of the mouth and jaw, and they are finished on the inside and the outside to present smooth surfaces where they come in contact with the mouth and the lips. The guard $f$ thus serves the twofold purpose of a means to hold the lip away from the teeth and to cover and protect the same on the right-hand side of the patient's mouth, and by inversion or being turned about end for end it serves to cover and hold up the upper lip on the opposite or left-hand side when work is being done on that side. In like manner the other guard $ff$ is employed to cover the upper lip on the right-hand side, or by proper adjustment it is made to serve as a protector to the lower lip on the left-hand side of the patient's mouth. Used in this way on one side or the other all parts of the mouth can be held and fully protected by employing the dilator or part $a$ with a single pair of the lip-guards $f$ and $ff$. It will be obvious, however, that separate sets of lip-guards and mouth-distending plates $a$ can be provided for each side of the patient's mouth instead of detaching and shifting the guard $f$ or $ff$ from the top or the bottom of the holder $a$, as shown in Figs. 1 and 5 of the drawings.

The shank or support $m$ of the mouth-mirror is best formed of silvered or nickel-plated copper wire having proper stiffness to support the mirror in any position and possessing as well sufficient pliability to allow for bending it in curves or angles as required to adjust the mirror in various positions in the mouth. A shank of this pliable character affords such universal adjustment of the mirror that any required position may be obtained without the use of hinge-joints or pivots, which are a common source of annoyance after they become loosened by wear. When not required for use, the mirror is readily detached from the support $a$ and removed from the mouth by loosening the screw $c$ and drawing the wire out of the socket $b$.

In many cases, and particularly while operating on a tooth in the lower part, it is necessary to hold the patient's tongue away, so as to prevent it from covering the posterior portion of the tooth, and to do this without using the rubber dam I have provided an attachment consisting of a saddle-plate $r$, shaped to fit the side of the tongue and lie over the top and furnished with a pliable wire $s$. The end of the wire $s$ is fitted to the socket $b$ when the mirror is removed, or a separate and additional socket $p$, with a clamp-screw $n$, can be provided on the same part $a$ to take the wire of the saddle-plate $r$, as I have illustrated in Fig. 9 of the drawings, and thus carry the tongue-holding attachment at the same time that the mirror is in use. Separate sockets and fastening means for these two devices or attachments provided on the support $a$ allow either or both of the devices to be employed at will without one interfering with the adjustment of the other.

Having thus fully described my invention, what I claim as new, and desire to secure by Letters Patent, is—

1. In a dental appliance, a dilator-plate combined with a lip-guard.

2. The combination with a dilator-plate adapted to engage and draw back the corner of the mouth in dental operations, of the detachable and adjustable lip-guards for covering the lip.

3. A dilator-plate adapted to engage and draw back the corner of the mouth and having a permanently-fixed socket on the outer face, in combination with a mouth-mirror, or similar appliance, having a supporting-stem composed of a length of pliable wire, as described.

4. The combination of the dilator-plate adapted to engage and draw back the corner of the mouth, a clamping-socket permanently fixed on said plate, a mouth-mirror, or similar appliance, provided with a clamping-socket and a stem uniting the mirror to the dilator-plate, formed of a piece of pliable wire, as described.

In testimony that I claim the foregoing I have hereunto set my hand and seal.

JOHN A. W. LUNDBORG. [L. S.]

Witnesses:
  A. J. HENRY,
  EDWARD E. OSBORN.